Jan. 19, 1937.  A. BAECHI  2,068,220
MACHINE FOR PRODUCING FOODSTUFFS MADE OF DOUGH
Filed April 27, 1934
*Fig. 1*
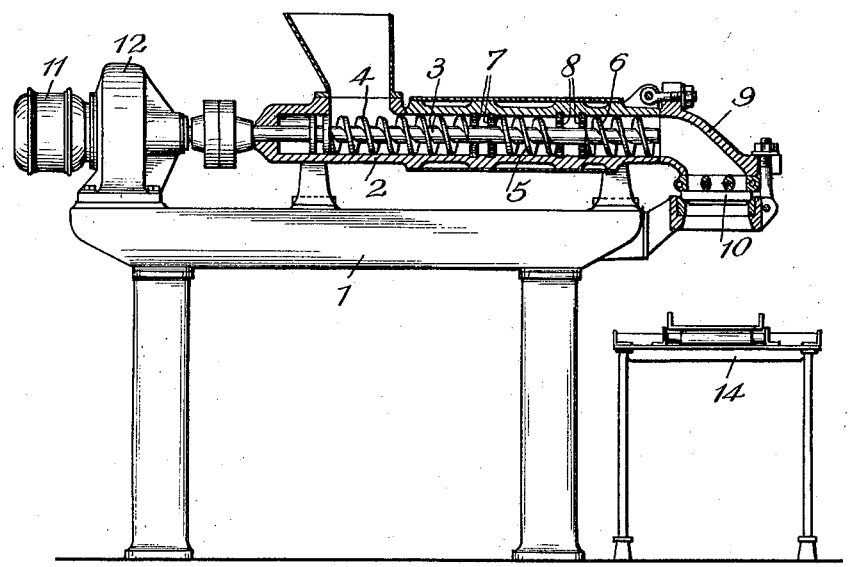
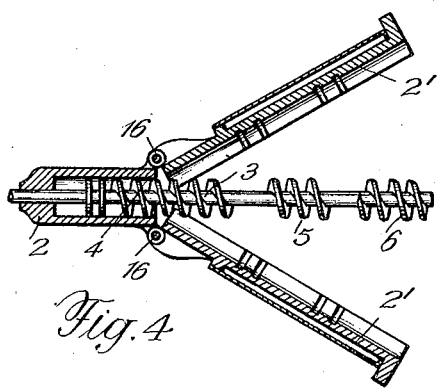
*Fig. 4*
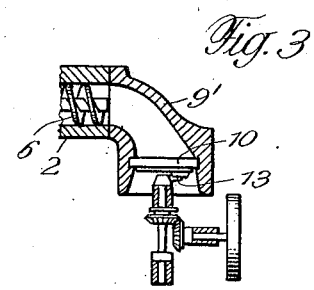
*Fig. 3*
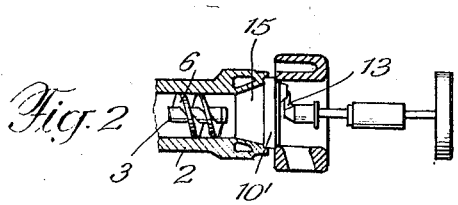
*Fig. 2*
Inventor:
August Baechi
By Sommers & Young
Attys.

Patented Jan. 19, 1937

2,068,220

UNITED STATES PATENT OFFICE 2,068,220

MACHINE FOR PRODUCING FOODSTUFFS MADE OF DOUGH

August Bacchi, Niederuzwil, Switzerland, assignor to the firm Gebrüder Bühler, Uzwil, Switzerland Application April 27, 1934, Serial No. 722,784
In Germany May 3, 1933

1 Claim. (Cl. 107—14)

For the purpose of producing foodstuffs from dough, ordinarily grits and water are mixed in a mixing machine whereupon the granular material arriving from the mixing machine is kneaded in an edge runner or a so-called gramola until a more or less consistent homogeneous dough or paste is formed. The pasty mass thus obtained is then cut to pieces which are removed from the machine by hand and thereupon admitted to a mechanically or hydraulically driven press for further treatment, in order to be finally squeezed through a sizing device forming a mouth piece of the press. This squeezing operation requires a specific pressure of from 100 to 200 kilograms per square centimetre of superficial area of the dough, depending on the consistency of the dough, so that the presses used for this purpose must be of a very heavy construction which increases the cost of manufacturing the same considerably. The same holds true for the edge runners or gramolas.

In the machine for producing foodstuffs of dough, according to this invention, a mixture of grits and water is worked in a screw press comprising a plurality of helical portions advantageously in the form of worms which are separated by perforated plates and the thusly produced dough is squeezed out of the press through a terminal plate adapted for sizing the dough.

Thus, in a single machine of a relatively simple construction from the starting materials finished dough products are made without touching the goods by the hands beginning with the starting materials up to the finished product.

In the accompanying drawing,

Fig. 1 shows a sectional elevation of the machine,

Fig. 2 shows a section of a modified mouth piece of the machine in connection with a cutting device, Fig. 3 depicts a variant construction of Fig. 2, and Fig. 4 shows a section of a modified detail of Fig. 1 with parts in opened positions.

The frame 1 of the machine carries a cylindrical casing 2 in which a shaft 3 is mounted which is provided with three helical portions in the form of worms 4, 5 and 6. Between the worms 4 and 5 a pair of perforated plates 7 is arranged and between the worms 5 and 6 a pair of perforated plates 8, the plates of each pair being spaced apart. The perforations in the plates 7 and 8 are stepped up as regards size in such manner that they become smaller from plate to plate considering the direction of delivery of the material.

The worm casing 2 communicates with an intermediate downwardly deflected socket 9 which incloses a sizing member 10 for the dough products. An electric motor 11 which is combined with a reduction gearing 12 serves for driving the worm shaft 3.

The manner of procedure is as follows:

A mixture obtained by mixing grits and water in usual manner in a mixing machine is introduced into the feed funnel of the screw press, seized by the first worm 4 and forced through the first pair of perforated plates at gradually increasing pressure. Thereupon the mixture is seized by the second worm 5 and again forced at gradually increasing pressure through the second pair of plates, the thus produced dough being then squeezed out of the screw press at gradually increasing pressure by the last worm 6 through the terminal plate 10 which serves at the same time as a sizing means. The dough delivered by the press is of a texture as usual for dough products.

In the constructional example of the screw press as shown in Fig. 1, the finished products are delivered through the horizontal sizing plate 10 at right angles thereto which is particularly advantageous for making long goods. If on the other hand chopped goods are to be produced, the intermediate socket 9 can be dispensed with and the sizing plate 10' connected directly to the worm casing 2 in vertical disposition at the end of an intervening conically enlarged portion 15 of the latter, as shown in Fig. 2. Furthermore, a cutting device 13 for the finished material similar to those frequently used in connection with hydraulic presses may be combined with the sizing plate 10'.

Alternatively, also with a sizing plate 10 inclosed in a downwardly deflected socket 9' a cutting device 13' operating horizontally may be combined (Fig. 3).

The finished products are conveniently caused to drop on a table 14 adapted for removing the same to the packing department or the like.

The number of perforated plates correlated to the worms may vary from at least one upwardly and is obviously so chosen that the dough arrives at the sizing plate 10 as a homogeneous mass of a requisite texture.

The worm casing 2 may be divided longitudinally, as shown in Fig. 4, and the two parts 2' thus formed pivoted at 16 to the remaining undivided portion of the casing 2. In this fashion ready access is provided to the worms and the perforated plates. In most cases the worm casing will however be made in one with a view to reducing the cost of manufacture of the machine and the worm shaft is so mounted that it can be readily dismounted, as frequently provided for machines for working foodstuffs. It is advisable to use shafts and worms that are made of rust-proof material, for example rust-proof steel. The same applies to the worm casing, unless it is preferred to equip the same with an interior sleeve of rust-proof material.

I do not limit myself to the particular size, shape, number or arrangement of parts as shown and described, all of which may be varied without going beyond the scope of my invention as shown, described and claimed.

What I claim is:

A machine for preparing the ingredients of dough into shaped dough bodies comprising, means for mixing the ingredients of the dough and for kneading the dough, said mixing and kneading means comprising an elongated casing, interiorly cylindrical and smooth, and divided transversely by a plurality of spaced partitions each containing a plurality of apertures, a longitudinally extending screw in said casing, and means for rotating said screw, said screw fitting said casing closely for preventing leakage of the material backwardly, whereby the ingredients of the dough are first mixed together, then subjected to gradually increasing pressure, subdivided into small streams with abrupt reduction of pressure, further gradual increase of pressure, further subdivision and sudden reduction of pressure.

AUGUST BAECHI.